United States Patent Office 3,051,592
Patented Aug. 28, 1962

3,051,592
CERAMIC METALIZING PROCESS
John J. Woerner, Santa Barbara, Calif., assignor to Penta Laboratories, Inc., Santa Barbara, Calif., a corporation of California
No Drawing. Filed Sept. 29, 1958, Ser. No. 763,783
5 Claims. (Cl. 117—121)

This invention relates to a metalized ceramic body and to a method of metalizing ceramic bodies.

In the construction of vacuum tubes and in other arts it is frequently necessary to form a bond between two ceramic bodies or to form a bond between ceramic and metallic bodies. The bond in many applications must be sufficiently non-porous to prevent the passage of gas or liquid through the bonded joint. The bond should have characteristics which will withstand considerable variations in temperature and humidity.

One method of bonding ceramic material to another body is by first coating the ceramic material with a thin layer of metal which is adhered by one means or another to the ceramic material. This is called metalizing. The metalized ceramic material may then be brazed or soldered to a similarly metalized ceramic body or to a metal body by commonly employed brazing techniques.

One of the problems that frequently arise in metalizing of ceramic materials is that the grain structure of the metalized coating is sufficiently large so that during the brazing operation a sufficient quantity of brazing alloy penetrates the metalized layer to the ceramic material thus dislodging the metalized coating from the ceramic material.

A principal object of this invention is to provide an improved method of metalizing ceramic material particularly of the alumina type wherein the metalized coating is formed of extremely fine granular structure.

Another object of this invention is to provide a process of metalizing requiring only one firing in a hydrogen or forming gas atmosphere.

A feature and advantage of the process of the invention is that the firing need not be maintained in a vacuum.

A further object of the process of the invention is to provide a metalized coating for a ceramic body formed of the combination of metallic oxides from the group consisting of molybdenum oxide and tungsten oxide together with manganese oxide and glass.

Another feature and advantage of the process of this invention is that by the steps of firing the ceramic material much of the oxygen is driven off to provide a coating having a substantially reduced oxygen content.

A still further object of this invention is to provide a metalized coating for an alumina ceramic body consisting of an alloy of manganese, glass and a metal from the group consisting of tungsten and molybdenum.

Still a further object of this invention is to provide a novel method of metalizing ceramic material by employing finely ground metallic oxides and bonding the oxides to the ceramic material and thence firing the body in a hydrogen atmosphere thus bonding the metal to the ceramic material and driving off a substantial portion of the oxygen.

Other objects of the present invention will become apparent upon reading the following specification and examples.

In the practice of this invention a mixture of powders is first prepared comprising a metal oxide or combination of metal oxides selected from the group consisting of molybdenum oxide ($MoO_3$) and tungsten oxide ($WO_2$), ground in finely ground particles and adding to the powder a smaller quantity of manganese oxide ($MnO_2$) and a smaller quantity of finely ground glass particles. The powder is then mixed with a nitro-cellulose lacquer wherein the powder, while suspended in the lacquer, is inserted in a ball mill to further reduce the size of the particles in the mixture. After being removed from the ball mill the lacquer mixture is stored in an agitated container until used. A ceramic body of alumina ceramic is then cleansed of all foreign material by washing in acetone followed by a distilled water rinse. The ceramic body is then coated by brushing or spraying the lacquer onto the face of the ceramic material. A layer of the lacquer of two or three thousandths of an inch thick is satisfactory. The metalized ceramic material is then fired at a temperature of approximately 1600° C. for five or ten minutes in a controlled atmosphere furnace using an atmosphere of hydrogen or forming gas $N_2+H_2$. The hydrogen or forming gas is humidified by bubbling the gas through water.

It has been found that the temperature may be lowered to about 1200° C. and, however, in such a case a longer firing time is necessary. A higher temperature than 1600° C. may convert the metalized layer to a semi-glassy or ceramic state which will not react to brazing material. The resulting coating may be electroplated in a conventional manner by employing nickel or copper.

It is believed that the molybdenum oxide or tungsten oxide is reduced to metallic molybdenum or tungsten, and the oxygen is driven off during the firing. It is believed that the manganese oxide in the mixture reacts with a ceramic material and forms an alloy with the metal of the molybdenum group. The glass is believed to combine with the ceramic to form a semi-glassy layer between the ceramic and metal coating. This layer is believed to fill in the pores of both ceramic and metal surfaces and provides a more complete bond for the metalized layer.

One specific example of the process and product of this invention comprises the following materials and steps.

A mixture of 150 grams of molybdenum oxide ($MoO_3$), 12.5 grams of manganese oxide ($MnO_2$) and 5.0 grams of glass, identified as borosilicate glass, manufactured by Corning Glass Works, was used. The composition of borosilicate glass Corning No. 7052 is not known with absolute certainty and may vary from sample to sample. Generally, it will fall within the following composition range shown and will, thus, be suitable for the present invention:

| | $SiO_2$ | $Na_2O$ | $K_2O$ | $B_2O_3$ | $Al_2O_3$ | $Li_2O$ | MgO |
|---|---|---|---|---|---|---|---|
| Percent range__ | 65-80 | 0-5 | 0.4-1.0 | 12-30 | 1-3 | 2.0 | 2.0 |

The glass was prepared by ball milling dry 200 mesh glass powder in a ball mill with high alumina ceramic balls for twenty-four hours at 120 r.p.m. The borosilicate glass, designated as 7052, was chosen for its apparent absence of materials which could be reducible in hydrogen. The manganese oxide and the molybdenum oxide were both reagent grade powders.

The three powders were placed in a ball mill with 200 cc. of nitro-cellulose lacquer. The lacquer was made from 100 cc. of pure nitro-cellulose lacquer having 45 seconds viscosity as measured with a #1 Zahn viscosimeter, thinned with 100 sc. of equal parts by volume of acetone and amyl acetate. The mixture was ball milled for forty-eight hours with high alumina ceramic balls. After being milled the mixture was placed in bottles which were stored on continuously rotating rollers to prevent settling out of the metallic oxide powders and glass powder within the cellulose lacquer. The lacquer was then painted on an alumina ceramic body by brush painting a layer of the material of approximately two to three thousandths of an inch in thickness. The body was then fired at 1600° C. in a controlled atmospheric furnace containing humidified hydrogen. The metalized ceramic was then found to have the property of being successfully brazed with a copper silver eutectic (Ag 72, Cu 28) in an atmosphere of dry hydrogen.

While the invention has been described for purposes of understanding by reference to the example it is to be understood that various modifications in the process and practice thereof and the product may be desirable. Therefore this application contemplates all modifications within the scope of the appended claims.

What is claimed is:

1. A method of metalizing an alumina type ceramic body including the steps of: coating the ceramic body with a mixture suspended in a liquid vehicle of at least about 1% of a finely divided borosilicate glass free from materials reducible in hydrogen and metal components consisting essentially of finely divided particles of manganese oxide, and at least one finely divided metal-oxide selected from the group consisting of molybdenum oxide and tungsten oxide; and firing the ceramic material in the presence of hydrogen at 1600° C. for 5 to 10 minutes.

2. A method of metalizing an alumina type ceramic body including the steps of: forming a mixture of metal components consisting essentially of molybdenum oxide and manganese oxide, and about 1% of borosilicate glass particles free from materials which are reducible in hydrogen; adding a nitrocellulose carrier; ball milling the mixture; coating said body with a thin layer of said mixture immediately after cessation of agitation of said mixture; and firing said body at a temperature range from about 1200° C. to 1600° C. in the presence of hydrogen.

3. A method of metalizing an alumina type ceramic body including the steps of: coating the body with a coating of finely ground particles of at least about 1% of a borosilicate glass having a composition:

| | $SiO_2$ | $Na_2O$ | $K_2O$ | $B_2O_3$ | $Al_2O_3$ | $Li_2O$ | $MgO$ |
|---|---|---|---|---|---|---|---|
| Percent range | 65–80 | 0–5 | 0.4–1.0 | 12–30 | 1–3 | 2.0 | 2.0 | and metal components consisting essentially of finely ground particles of manganese oxide and particles of at least one finely ground metal oxide selected from the group consisting of molybdenum oxide and tungsten oxide; and firing the coated ceramic body at a temperature of between 1200° C. and 1600° C. in the presence of hydrogen.

4. In the method of metalizing a ceramic body with a metallic-glass coating in combination with a vehicle therefor wherein said glass is free from materials reducible in hydrogen and including the step of firing said body in the presence of hydrogen to reduce the metallic constituents, the improvement which comprises coating said body with a metallic-glass coating whose metallic components consist essentially of finely divided manganese oxide and a finely divided oxide selected from the group consisting of molybdenum oxide and tungsten oxide.

5. The improved method in accordance with claim 4 wherein the metal oxide selected is molybdenum oxide.

References Cited in the file of this patent

UNITED STATES PATENTS

| | | |
|---|---|---|
| 2,282,106 | Underwood | May 5, 1942 |
| 2,663,658 | Schurecht | Dec. 22, 1953 |
| 2,667,427 | Nolte | Jan. 26, 1954 |
| 2,780,561 | La Forge | Feb. 5, 1957 |
| 2,814,571 | Iversen | Nov. 26, 1957 |
| 2,835,967 | Umblia | May 27, 1958 |
| 2,857,664 | Luks et al. | Oct. 28, 1958 |
| 2,904,456 | Nolte | Sept. 15, 1959 |
| 2,985,547 | Luks | May 23, 1961 |